(12) United States Patent
Park et al.

(10) Patent No.: US 11,999,911 B2
(45) Date of Patent: Jun. 4, 2024

(54) CATALYST FOR HYDROGENATION AND METHOD FOR PREPARING SAME

(71) Applicant: HANWHA SOLUTIONS CORPORATION, Seoul (KR)

(72) Inventors: Woo Jin Park, Daejeon (KR); Bong Sik Jeon, Daejeon (KR); Yong Hee Lee, Daejeon (KR); Eui Geun Jung, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 10 days.

(21) Appl. No.: 17/623,306

(22) PCT Filed: Jun. 25, 2020

(86) PCT No.: PCT/KR2020/008292
§ 371 (c)(1),
(2) Date: Dec. 28, 2021

(87) PCT Pub. No.: WO2020/262989
PCT Pub. Date: Dec. 30, 2020

(65) Prior Publication Data
US 2022/0372380 A1 Nov. 24, 2022

(30) Foreign Application Priority Data

Jun. 28, 2019 (KR) .......................... 10-2019-0078368

(51) Int. Cl.
*C10G 29/16* (2006.01)

(52) U.S. Cl.
CPC ..... *C10G 29/16* (2013.01); *C10G 2300/1037* (2013.01); *C10G 2300/703* (2013.01); *C10G 2300/705* (2013.01)

(58) Field of Classification Search
CPC . B01J 21/08; B01J 23/002; B01J 23/72; B01J 23/755; B01J 27/02; B01J 27/043;
(Continued)

(56) References Cited

U.S. PATENT DOCUMENTS

| 4,251,394 A | 2/1981 | Carter | |
| 5,482,616 A * | 1/1996 | Brahma | .................... C07C 5/10 208/143 |

(Continued)

FOREIGN PATENT DOCUMENTS

| CN | 101172237 A | 5/2008 |
| CN | 102407118 A | 4/2012 |

(Continued)

OTHER PUBLICATIONS

Wolf, M. et al., 2016, Catalysis Today, 275, 135-140. (Year: 2016).*
(Continued)

*Primary Examiner* — Brian A McCaig
(74) *Attorney, Agent, or Firm* — Harvest IP Law, LLP (57) ABSTRACT

The present invention relates to a catalyst for hydrogenation and a method for preparing the same, and more specifically, provides a catalyst having improved activity by including copper and copper oxide as a promoter when a hydrogenation catalyst including nickel is prepared by using a deposition-precipitation (DP) method. Accordingly, a catalyst having high activity may be provided in a hydrogenation process of a hydrocarbon resin.

14 Claims, 2 Drawing Sheets

(58) Field of Classification Search
CPC ........ B01J 33/00; B01J 35/006; B01J 35/023; B01J 35/1019; B01J 35/1038; B01J 35/1061; B01J 37/035; B01J 37/088; B01J 37/14; B01J 37/18; B01J 2523/00; C10G 29/06; C10G 45/06; C10G 2300/1037; C10G 2300/703; C10G 2300/705; C08F 8/04

See application file for complete search history.

(56) References Cited

U.S. PATENT DOCUMENTS

| | | | | |
|---|---|---|---|---|
| 6,281,163 | B1 * | 8/2001 | Van Dijk | B01J 23/755 554/146 |
| 2014/0256972 | A1 * | 9/2014 | Bouwman | C11C 3/123 502/259 |

FOREIGN PATENT DOCUMENTS

| CN | 104588024 A | 5/2015 |
|---|---|---|
| EP | 3903930 A1 | 11/2021 |
| EP | 3907001 A1 | 11/2021 |
| JP | S5294890 A | 8/1977 |
| KR | 1020090064455 A | 6/2009 |
| KR | 1020100106865 A | 10/2010 |
| KR | 1020130051937 A | 5/2013 |
| KR | 1020140096279 A | 8/2014 |
| KR | 1020160040177 A | 4/2016 |
| KR | 1020160083522 A | 7/2016 |
| KR | 1020190017229 A | 2/2019 |
| WO | 2019201618 A1 | 10/2019 |
| WO | 2020138684 A1 | 7/2020 |
| WO | 2020141705 A1 | 7/2020 |

OTHER PUBLICATIONS

Hydrogenation of Dicyclopentadiene Resin and Its Monomer over High Efficient CuNi Alloy Catalysts, Zongxuan Bai et al., 2019 Wiley-VCH Verlag Gmbh & Co. KGaA, Weinheim, ChemistrySelect 2019, 4, pp. 6035-6042 DOI: 10.1002/slct.201900476.
Selective hydrogenation of 1,3_pentadiene over mono_ and bimetallic sulfidized Ni(Cu)-S/SiO2 catalysts, Russian Chemical Bulletin, International Edition, vol. 65, No. 12, pp. 2841-2844, Dec. 2016, pp. 2841-2844.
Extended European Search Report issued on Sep. 22, 2023.
"Fundamentals of Chemical Engineering", Edited by Wuhan University, Higher Education Press, pp. 357-358, Jul. 2001.

* cited by examiner

CATALYST FOR HYDROGENATION AND METHOD FOR PREPARING SAME

CROSS-REFERENCE TO RELATED APPLICATIONS

This application is a National Stage of International Application No. PCT/KR2020/008292 filed Jun. 25, 2020, claiming priority based on Korean Patent Application No. 10-2019-0078368 filed Jun. 28, 2019.

TECHNICAL FIELD

The present invention relates to a catalyst for hydrogenation and a method for preparing the same, and more specifically, provides a catalyst having improved activity by including copper and copper oxide as a promoter when a hydrogenation catalyst including nickel is prepared by using a deposition-precipitation (DP) method. Accordingly, a catalyst having high activity may be provided in a hydrogenation process of a hydrocarbon resin.

BACKGROUND ART

Naphtha cracking is an important process for the production of basic intermediates, such as lower olefins (i.e., ethylene, propylene, butylene, and butadiene) and aromatic compounds (i.e., benzene, toluene, and xylene), which are widely used in the petrochemical and chemical industries. Thermal cracking or steam pyrolysis is the main type of process that is typically performed for forming these materials in the presence of steam and in the absence of oxygen. A feedstock may include, in addition to naphtha, petroleum gases and distillates such as kerosene and gas oil. In this case, naphtha or the like may be pyrolyzed to produce materials such as C4 fraction including ethylene, propylene, butane, and butadiene, C5 fraction including dicyclopentadiene, isoprene, and piperylene, cracked gasoline (including benzene, toluene, and xylene), cracked kerosene (C9 or more fractions), cracked heavy oil (ethylene bottom oil), and hydrogen gas. Of these materials, hydrocarbon resins may be produced by polymerizing C5 and C9 fractions.

Hydrocarbon resins among the C5 fractions include dicyclopentadiene (DCPD) as a main ingredient and may copolymerize propylene, isoprene, styrene, and the like. However, since hydrocarbon resins include unsaturated bonds in part, hydrocarbon resins have a yellow or orange color and have a peculiar bad smell of hydrocarbon resins. At this time, if a hydrogenation process of adding hydrogen is performed, unsaturated bonds are removed so that the color becomes brighter and the odor peculiar to hydrocarbon resins decreases, resulting in an improvement in quality. In hydrocarbon resins, from which unsaturated bonds are removed, are called water-white resins because they are colorless and transparent, and are distributed as high-quality resins with excellent heat resistance and ultraviolet stability.

In the hydrocarbon resin hydrogenation process, the application of a hydrogenation catalyst is essential. As a hydrogenation catalyst for a hydrocarbon resin, various noble metals such as palladium, platinum, and rhodium or various transition metals such as nickel and cobalt are used as active ingredients, and the form of being supported on silica, alumina, activated carbon, titania, or the like is applicable.

Korea Patent Publication No. 10-2019-0017229 discloses nickel, palladium, cobalt, platinum, and rhodium as hydrocarbon resin hydrogenation catalysts.

In addition, Korean Patent Publication No. 10-2016-0040177 discloses a result of using a cobalt-promoted nickel catalyst on silica/alumina as a hydrocarbon resin hydrogenation catalyst.

A nickel-containing catalyst has an advantage of high activity in a hydrogenation reaction, compared with catalysts including other transition metals. However, in order to secure the activity of the catalyst in the hydrocarbon resin hydrogenation reaction, nickel is preferably included in an amount of at least 40 wt %. In a case in which nickel is supported on a carrier, as the nickel content increases, dispersibility decreases, resulting in an increase in the size of nickel crystals and reducing the activity of the catalyst accordingly. If the nickel content is lowered so as to prevent the above problem, dispersibility is relatively improved, but activity is reduced. Therefore, it is necessary to support a high content of nickel and also maintain a crystal size of nickel at an appropriate level.

On the other hand, the hydrocarbon resin hydrogenation reaction is carried out by dispersing a powdered hydrogenation catalyst in a reactant solution in which a hydrocarbon resin is dissolved, and then rotating it at high speed. Since the catalyst is mixed in the solution, a filter is installed at an outlet of a reactor to separate the product solution and the catalyst. Since the product solution is filtered and separated through a catalyst layer on the filter surface, the filterability of the catalyst is one of the important indicators to determine the stable operation of the process. The filterability of the catalyst is generally determined by the particle size distribution of the catalyst. As the size of the particles increases, the pore volume between the particles increases and thus the filterability increases. In particular, the pore size of the filter separating the catalyst and the product solution is about 1 μm. Therefore, when the proportion of crystal particles having a size of 1 μm or less is high, the pores of the filter are blocked and the filterability is greatly reduced.

In addition, the catalyst in powder form is dispersed in the solution and rotated at high speed. Therefore, as the operating time elapses, the catalyst is pulverized so that the average particle size continues to decrease, and the proportion of catalyst particles having a size of 1 μm or less also increases. Thus, the hydrocarbon resin hydrogenation catalyst must have high filterability for a high-viscosity hydrocarbon resin solution, and must suppress the generation of particles having a size of 1 μm or less even after high-speed pulverization.

Therefore, there is an urgent need to develop a catalyst suitable for a hydrocarbon resin hydrogenation reaction that overcomes the above-mentioned problems.

(Patent Literature 1) Korean Patent Publication No. 10-2019-0017229 (2019 Feb. 20)

(Patent Literature 2) Korean Patent Publication No. 10-2016-0040177 (2016 Apr. 12)

DESCRIPTION OF EMBODIMENTS

Technical Problem

The present invention aims to solve the above-described problems.

Another object of the present invention is to improve activity of a catalyst for a hydrogenation reaction by improving dispersibility while including a high content of nickel and having a small crystallite size of nickel.

Another object of the present invention is to provide a catalyst that provides a high reduction degree at a low reduction temperature of 300-450° C.

Another object of the present invention is to provide a catalyst in which the size distribution of catalyst particles is uniform and crushing of particles is suppressed during high-speed rotation in a hydrogenation reaction. Therefore, a catalyst having improved filterability in a hydrocarbon resin hydrogenation reaction is provided.

Solution to Problem

In order to achieve the above-described objects of the present invention and achieve the characteristic effects of the present invention described below, the characteristic construction of the present invention is as follows.

According to an embodiment of the present invention, there is provided a catalyst including an active ingredient, a promoter, and a silica carrier.

More specifically, there is provided a catalyst for hydrogenation, including 0.01-5 parts by weight of at least one promoter selected from copper and copper oxide and 10-50 parts by weight of a silica carrier, based on 40-80 parts by weight of at least one active ingredient selected from nickel and nickel oxide.

In addition, 0.1-2 parts by weight of at least any one selected from sulfur and sulfur oxide may be further included as the promoter when necessary.

According to another embodiment of the present invention, there is provided a method for preparing a catalyst for hydrogenation, including the steps of: preparing a first solution by dissolving a nickel precursor in a solvent, so that a weight concentration (g/L) of nickel in a solution is 25 to 250; preparing a second solution by adding a copper precursor to the first solution, so that a weight concentration (g/L) of copper in a solution is 0.01 to 5; preparing a third solution by adding a silica carrier to the second solution and dispersing the silica carrier, so that a weight concentration (g/L) of silica in a solution is 10 to 50; adding the third solution to a precipitation container and stirring and heating the third solution to a temperature to 50-120° C.; adding a pH control agent to the heated third solution and depositing the nickel and copper precursors on the solid silica carrier forming a precipitation; washing and filtering the supported catalyst and drying the supported catalyst at 100-200° C. for 5 to 24 hours; calcining the dried catalyst at a temperature of 200-500° C. in air; and activating the calcined catalyst by reducing the calcined catalyst to a temperature of 200-500° C. in a hydrogen atmosphere.

According to an embodiment of the present invention, there is provided a hydrogenation method for a hydrocarbon resin, which contacts a hydrocarbon resin with hydrogen in the presence of the catalyst prepared by the method described above.

Advantageous Effects of Disclosure

According to the present invention, even when a high content of nickel is supported, the crystallite size of activated nickel metal is small, the dispersion degree is high, and excellent hydrogenation activity is provided.

The present invention has an effect of providing a catalyst that provides a high reduction degree at a low reduction temperature of 300-450° C.

According to the present invention, the use of a silica carrier with a controlled particle size distribution provides an effect that the size distribution of catalyst particles is uniform and the crushing of particles is suppressed during high-speed rotation in a hydrogenation reaction. Therefore, an effect of improving filterability in a hydrocarbon resin hydrogenation reaction is provided.

BEST MODE

The present invention will be described with reference to specific embodiments and the accompanying drawings. The embodiments will be described in detail in such a manner that the present invention can be carried out by those of ordinary skill in the art. It should be understood that various embodiments of the present invention are different from each other, but need not be mutually exclusive. For example, certain shapes, structures, and features described herein may be implemented in other embodiments without departing from the spirit and scope of the present invention in connection with one embodiment. In addition, it should be understood that the locations or arrangement of individual components in the embodiments can be changed without departing from the spirit and scope of the present invention. Therefore, the following detailed description is not to be taken in a limiting sense, and the scope of the present invention is to be limited only by the appended claims and the entire scope of equivalents thereof, if properly explained.

Hereinafter, embodiments of the present invention will be described with reference to the accompanying drawings, so that those of ordinary skill in the art can easily carry out the present invention.

According to an embodiment of the present invention, there is provided a nickel-based hydrogenation catalyst for hydrogenation in order to improve the quality of a hydrocarbon resin prepared by polymerization of dicyclopentadiene (DCPD) as a main raw material. The DCPD hydrocarbon resin has a yellow color due to unsaturated bonds remaining after polymerization (unsaturated bonds of olefins and aromatics), has a foul odor, and is easily oxidized in air.

Therefore, in order to improve the quality of the hydrocarbon resin, a colorless, odorless, and transparent water-white hydrocarbon resin with improved thermal stability, from which unsaturated bonds are removed, may be provided by performing the hydrogenation reaction under high temperature and high pressure condition by using nickel catalyst, and preferably a nickel powder catalyst including copper as a promoter.

In a deposition-precipitation (DP) method as a catalyst preparing method of the present invention, a metal precursor salt solution and a pH control agent react in a carrier dispersion to form a precipitate, and this is adsorbed and solidified on the surface of the carrier. It was confirmed that the uniformity of the catalyst was incomparable, compared with metal catalysts produced by an existing coprecipitation method and impregnation method. In addition, there is an advantage in that it is easy to select and optimize a carrier having a particle size, size distribution, surface area, pore structure, etc. suitable for the reaction.

A nickel-containing catalyst has an advantage of high activity in a hydrogenation reaction, compared with catalysts including other metals. In a case in which a nickel precursor is supported on a carrier by a DP method, as the nickel content increases, a crystallite size is increased and dispersibility is deteriorated, thus the activity of the catalyst is lowered. If the nickel content is lowered so as to prevent the above problem, dispersibility is relatively improved, but activity is lowered. Thus, it is not possible to prepare a commercially available nickel-supported catalyst by a DP method. In addition, the existing DP method provides the activation of the catalyst by performing a reduction reaction at a high temperature exceeding 450° C.

Therefore, according to an embodiment of the present invention, the addition of copper as a promoter makes it possible to obtain a high reduction degree at a low reduction temperature of 300-450° C., compared with the conventionally known method. Simultaneously, even when supported by the DP method, excellent activity may be provided in the hydrogenation reaction by providing a catalyst having a small crystallite size and high dispersion degree despite a high nickel content after reduction. In addition, the catalyst may provide an effect of having a high reduction degree of 80% or more after removal of a passivation layer.

According to an embodiment of the present invention, there is provided a catalyst for hydrogenation, including an active ingredient, a promoter, and a silica carrier.

More specifically, the catalyst for hydrogenation includes 0.01-5 parts by weight of at least one promoter selected from copper and copper oxide and 10-50 parts by weight of a silica carrier, based on 40-80 parts by weight of at least one active ingredient selected from nickel and nickel oxide.

According to an embodiment of the present invention, the hydrogenation catalyst may be prepared by mixing nickel or nickel oxide in a solvent, and may be prepared by mixing copper and copper oxide in a solvent. If a precipitate is used for them, nickel and copper components may be deposited on a solid carrier suspended in a solvent.

In this case, a nickel source (precursor) may include nickel and metal salts such as nitrate, acetate, sulfate, chloride, etc., and most preferably a nickel sulfate precursor including sulfate.

In addition, as a copper source (precursor), a state of being bonded to copper, copper oxide, and metal salts such as nitrate, acetate, sulfate, chloride, or a combination thereof may be used. A copper sulfate precursor is most preferable. However, the present invention is not limited thereto.

Finally, the nickel oxide may be preferably NiO, and the copper oxide may be preferably CuO.

According to an embodiment of the present invention, when necessary, the promoter may further include 0.1-2 parts by weight of at least one selected from sulfur and sulfur oxide.

In addition, the nickel oxide and the sulfur oxide are included, wherein the sulfur oxide may be included in an amount of 0.1-2.0 parts by weight based on 100 parts by weight of the nickel oxide. That is, a sulfur oxide/nickel oxide [$SO_3$/NiO] weight ratio may be 0.1 to 2.0.

By supporting sulfur together with nickel in the above range as the promoter, the hydrogenation performance can be greatly improved by greatly increasing the rate of aromatic hydrogenation relative to olefins in a hydrogenation reaction of an unsaturated hydrocarbon compound including an aromatic group. When the remaining sulfur and sulfur oxide exceed 2 parts by weight, there is a disadvantage in that the hydrogenation reaction performance is sharply deteriorated.

As the sulfur source (precursor), a state of being bonded to sulfur, sulfur oxide, and metal salts such as nitrate, acetate, sulfate, chloride, or a combination thereof may be used, but the present invention is not limited thereto.

According to an embodiment of the present invention, the nickel is included in an amount of 50 parts by weight or more, and the nickel oxide and the copper oxide are included, wherein the copper oxide is included in an amount of 0.01-2.0 parts by weight based on 100 parts by weight of all of the nickel oxide and the copper oxide. Preferably, the nickel is included in an amount of 50-70 parts by weight, and a CuO/(NiO+CuO) weight ratio is 1.0 to 1.5.

Therefore, the dispersion degree, which is a problem in the DP method having a high nickel content, may be solved by including copper. That is, it is possible to provide a catalyst having a high nickel content, a small crystallite size, and high dispersion degree, thereby providing excellent activity in the hydrogenation reaction.

According to an embodiment of the present invention, the nickel is included in an amount of 50 parts by weight or more, and the nickel oxide and the copper oxide are included, wherein the copper oxide is included in an amount of 0.01-2.0 parts by weight based on 100 parts by weight of all of the nickel oxide and the copper oxide. Preferably, the nickel may be included in an amount of 50-70 parts by weight. A CuO/(NiO+CuO) weight ratio may be 1.0 to 1.5.

According to an embodiment of the present invention, there may be provided a catalyst for hydrogenation of a hydrocarbon resin, in which a particle size distribution of the catalyst has an average particle size ($D_{50}$) of 5-7 μm, a diameter ($D_{10}$) of particles corresponding to the bottom 10% by volume is 2 μm or more, and a diameter ($D_{90}$) of particles corresponding to the top 10% by volume is 15 μm or less. When the proportion of a particle size of 1 μm or less, which is less than the above range, increases, the pores of the filter are blocked in the hydrogenation reaction process, and thus the filterability of the catalyst may be reduced and become insufficient. When the proportion is greater than the above range, the activity of the catalyst may be lowered. Therefore, it is possible to improve activity of the catalyst for the hydrogenation reaction by improving dispersibility while including a high content of nickel and having a small crystallite size of nickel.

In addition, in the case of including the average particle size as described above, the dispersibility of the catalyst is high, the catalyst activity is excellent, and there is an advantage in that a high nickel reduction degree can be obtained.

In general, the pore structure of a solid porous material may be determined by several methods. One of the most widely used methods is a nitrogen isothermal adsorption/desorption method based on the BET theory (Brunauer, Emmett and Teller) for the evaporation (desorption) of adsorbed gases during adsorption and desorption of multi-layer gases condensed on solid surfaces. Nitrogen is a common adsorbent for probing micro- and mesoporous regions. From the adsorption and desorption isotherms, the following can be calculated. The BET surface area from adsorption of monolayer nitrogen, the total pore volume taken from the amount of adsorbed nitrogen with P/P0=0.99, and the mean pore diameter may be determined from adsorption or desorption data using a calculation method based on the BET theory or the BJH (Barrett, Joyner and Halenda) theory.

Therefore, in a pore structure analysis of the catalyst using a nitrogen adsorption method, a meso pore size is 4.5 nm or more, and preferably 4.5-8.0 nm.

In addition, a BET specific surface area is 200 $m^2$/g or more, and preferably 200-300 $m^2$/g, and a cumulative volume of BJH adsorption is 0.25 $cm^3$/g or more, and preferably 0.25-0.35 $cm^3$/g. When the catalyst is out of the conditions such as the pore structure and the surface area as described above, the activity of the catalyst is lowered.

According to an embodiment of the present invention, the carrier is preferably a silica carrier, and the silica carrier is a porous carrier having a specific surface area of 200-400 m²/g and a pore size of 10-30 nm. Therefore, it is possible to improve activity and catalyst life and it is possible to optimally provide an effect of improving the efficiency of the process of separating the product and the catalyst. In addition, by providing the silica carrier having a uniform particle size distribution, it is possible to provide an effect of suppressing the crushing of the catalyst even during high-speed rotation in the hydrogenation reaction.

According to an embodiment of the present invention, the silica carrier having a particle size, size distribution, surface area, pore structure, etc. suitable for the reaction and the catalyst in the range of the above-described optimized combination are provided using the catalyst satisfying the above conditions. Therefore, the catalyst may provide a nickel (NI) reduction degree of 80% or more in the hydrogenation reaction.

The reduction degree may be measured by hydrogen-temperature program reduction (H₂-TPR). A reduction degree analysis method is as follows.

$$\text{Degree of reduction} = \frac{\text{②} - \text{①}}{\text{②}} \times 100$$

① Analysis Method
1) Amount of Catalyst Used
0.05 g
2) Catalyst Pretreatment
He flows and temperature is raised to 300° C.
H₂ flows and temperature is maintained at 300° C. for 45 minutes.
He flows and cooling analysis is performed at 30° C.
3) H₂-TPR Analysis
Gas to be analyzed: H₂/Ar mixed gas
Temperature: Raising temperature at a rate from 30° C. to 810° C.
② Analysis Method
1) Amount of Catalyst Used
0.05 g
2) Catalyst Pretreatment
He flows and temperature is raised to 300° C.
H₂ flows and temperature is maintained at 300° C. for 45 minutes.
He flows and temperature is raised to 400° C.
O₂ flows and temperature is maintained at 400° C. for 2 hours.
Cooling to 60° C.
3) H₂-TPR Analysis
Gas to be analyzed: H₂/Ar mixed gas
Temperature: Raising temperature at a rate from 60° C. to 810° C.

The catalyst for the hydrogenation reaction according to an embodiment of the present invention may hydrogenate the hydrocarbon resin including C5 or C9 hydrocarbon fractions, by-products, and a combination thereof through distillation, pretreatment, and polymerization.

According to an embodiment of the present invention, the reactant in the hydrogenation reaction may be a hydrocarbon resin (petroleum resin). In this case, the hydrocarbon resin may include dicyclopentadiene (DCPD).

Furthermore, the reactant in the hydrogenation reaction may be a hydrocarbon resin including $C_5$ fraction or a hydrocarbon resin including $C_9$ fraction. In addition, the reactant in the hydrogenation reaction may be a hydrocarbon resin including DCPD fraction by-products and a combination thereof, and may include cyclic diene and benzene functional groups, but the present invention is not limited thereto.

The DCPD has a yellow color due to unsaturated bonds remaining after polymerization (unsaturated bonds of olefins and aromatics), has a foul odor, and is easily oxidized in air. Therefore, in order to improve the quality of the hydrocarbon resin, when the hydrogenation reaction is performed under high temperature and high pressure conditions by using the nickel-based catalyst according to the present invention, a colorless, odorless, and transparent water-white hydrocarbon resin with improved thermal stability, from which unsaturated bonds are removed, may be provided.

The catalyst according to the present invention may be in the form of powder, particles, or granules. The catalyst according to the present invention is preferably provided in the form of powder.

On the other hand, the present invention provides a method for preparing the catalyst for hydrogenation.

The method for preparing the catalyst for hydrogenation includes the steps of: preparing a first solution by dissolving a nickel precursor in a solvent, so that a weight concentration (g/L) of nickel in a solution is 25 to 250; preparing a second solution by adding a copper precursor to the first solution, so that a weight concentration (g/L) of copper in a solution is 0.01 to 5; preparing a third solution by adding a silica carrier to the second solution and dispersing the silica carrier, so that a weight concentration (g/L) of silica in a solution is 10 to 50; adding the third solution to a precipitation container and stirring and heating the third solution to a temperature to 50-120° C.; adding a pH control agent to the heated third solution and depositing the nickel and copper precursors on the solid silica carrier forming a precipitation; washing and filtering the supported catalyst and drying the supported catalyst at 100-200° C. for 5 to 24 hours; calcining the dried catalyst at a temperature of 200-500° C. in air; and activating the calcined catalyst by reducing the calcined catalyst to a temperature of 200-500° C. in a hydrogen atmosphere.

In addition, the method may further include, after the activating step, passivating the catalyst. The calcining step is not necessarily provided, and those of ordinary skill in the art may appropriately select the step according to necessity.

The passivating step may be provided in two methods. First, a method of passivating with a nitrogen mixed gas including 0.1-20% oxygen may be provided. In this case, % refers to volume %.

Second, a step of passivating by immersion in a solution included in an organic solvent may be provided. For example, D40 Exxsol may be used as the organic solvent, and any organic solvent capable of blocking air may be used without limitation.

According to one embodiment of the present invention, the step of adding the pH control agent to the heated third solution and depositing the nickel and copper precursors on the solid silica carrier forming the precipitation, the precipitation may be formed at pH 7-10. The precipitation may be performed in an environment of pH 7 or higher, and preferably pH 7-9, by the addition of a base or an electrochemical means. In this case, a basic compound may be added for the addition of the base. The basic compound may include sodium carbonate, sodium hydroxide, sodium hydrogen carbonate, ammonia, or a hydrate thereof, and preferably sodium carbonate or a hydrate thereof, but the present invention is not limited thereto.

According to an embodiment of the present invention, there is provided a hydrogenation method for contacting a hydrocarbon resin with hydrogen in the presence of the catalyst for hydrogenation prepared by the above-described preparing method.

The hydrocarbon resin may be hydrogenated at a temperature of 100-400° C., and preferably 200-300° C., and at a pressure of 1-200 bar, and preferably 30-100 bar. A hydrogenation time may depend primarily on the temperature, the amount of catalyst, and the degree of hydrogenation.

A hydrogenation reaction may be carried out in various reactors. Preferably, the hydrogenation reaction may be carried out in a continuous stirred tank reactor (CSTR) or a loop reactor. In addition, the optimal activity may be exhibited when a reduction temperature is 200-500° C., and preferably 350-450° C., as described above.

According to an embodiment of the present invention, the hydrocarbon resin that is the reactant in the hydrogenation reaction may include dicyclopentadiene (DCPD). In addition, a hydrocarbon resin including C5 fraction may be provided, and a hydrocarbon resin including C9 fraction may be provided.

Hereinafter, the structure and operation of the present invention will be described in more detail with reference to preferred examples of the present invention. However, these examples are shown by way of illustration and should not be construed as limiting the present invention in any sense.

Since contents not described herein can be sufficiently technically inferred by those of ordinary skill in the art, descriptions thereof will be omitted.

Example 1

40 g of a porous silica powder having a surface area of 300 m$^2$/g, a pore size of 21 nm, and an average particle size 7 μm, 491 g of nickel sulfate, 6 g of copper sulfate, and 2,000 ml of distilled water were added to a precipitation container, stirred, and heated to a temperature of 80° C. After the temperature reached 80° C., 1,500 mL of a solution including 262 g of sodium carbonate was all injected within 1 hour by using a syringe pump. After completion of precipitation, a slurry had a pH of 7.5, was washed with about 30 L of distilled water, filtered, and then dried at 100° C. for 8 hours or more by using a drying oven. This was subdivided and calcined at a temperature of 400° C. in an air atmosphere. After this was subdivided again, the catalyst was activated by performing the reduction at a temperature of 400° C. in after hydrogen atmosphere. The activated catalyst was passivated using a nitrogen mixed gas including 1% oxygen to prepare a hydrogenation catalyst.

Based on the weight of the catalyst, a nickel oxide (NiO) content of a passivated catalyst was measured as 78.4 parts by weight, a weight of sulfur oxide (SO$_3$) was measured as 0.8 parts by weight, a weight of copper oxide (CuO) was measured as 1.0 parts by weight, and an average size of nickel crystals was measured as 3.5 nm. A CuO/(NiO+CuO) weight ratio of the prepared catalyst was 1.18, and a SO$_3$/NiO weight ratio was 1.02. A BET specific surface area was 250 m$^2$/g, a total pore volume was 0.37 m$^3$/g, and an average pore size was 5.8 nm. A catalyst particle size distribution was $D_{10}$ of 2.5 μm, $D_{50}$ of 5.5 μm, and $D_{90}$ of 12.9 μm. A nickel (Ni) reduction degree analyzed by H$_2$-TPR was 85%.

Example 2

A hydrogenation catalyst was prepared in the same manner as in Example 1, except that a CuO/(NiO+CuO) weight ratio in a catalyst preparation material was 1.06 and a SO$_3$/NiO weight ratio was 0.76.

Example 3

A hydrogenation catalyst was prepared in the same manner as in Example 1, except that a CuO/(NiO+CuO) weight ratio in a catalyst preparation material was 1.41 and a SO$_3$/NiO weight ratio was 0.89.

Comparative Example 1

A hydrogenation catalyst was prepared in the same manner as in Example 1, except that copper sulfate was not added as a catalyst preparation material.

Based on the weight of the catalyst, a nickel oxide (NiO) content of a passivated catalyst was measured as 79.3 parts by weight, a sulfur oxide (SO$_3$) content was 0.7 parts by weight, and an average size of nickel crystals was measured as 4.2 nm. A BET specific surface area was 240 m$^2$/g, a total pore volume was 0.35 m$^3$/g, and an average pore size was 5.4 nm. A catalyst particle size distribution was $D_{10}$ of 2.9 μm, $D_{50}$ of 5.8 μm, and $D_{90}$ of 10.9 μm. A nickel (Ni) reduction degree analyzed by H$_2$-TPR was 82%.

Table 1 below shows the components in the catalyst compositions of Examples and Comparative Example 1.

TABLE 1

| Classification | Unit | Example 1 | Example 2 | Example 3 | Comparative Example 1 |
|---|---|---|---|---|---|
| CuO/(NiO + CuO) | parts by weight | 1.18 | 1.06 | 1.41 | 0 |
| SO$_3$/NiO | parts by weight | 1.02 | 0.76 | 0.89 | 0.88 |
| Ni crystallite size | nm | 3.5 | 3.7 | 4.1 | 4.2 |
| NiO | parts by weight | 78.4 | 79.0 | 78.5 | 79.3 |
| CuO | parts by weight | 1.0 | 0.9 | 1.2 | 0 |
| SO$_3$ | parts by weight | 0.8 | 0.6 | 0.7 | 0.7 |
| SiO$_2$ | parts by weight | 19.1 | 18.9 | 19.2 | 19.2 |
| BET specific-Surface area | m$^2$/g | 250 | 240 | 245 | 240 |
| Total poreVolume | cm$^3$/g | 0.37 | 0.35 | 0.38 | 0.35 |
| Mean pore diameter | nm | 5.8 | 5.9 | 5.9 | 5.4 |
| $D_{10}$ | μm | 2.5 | 2.8 | 2.5 | 2.9 |
| $D_{50}$ | μm | 5.5 | 5.8 | 5.9 | 5.8 |
| $D_{90}$ | μm | 12.9 | 10.9 | 10.9 | 10.9 |
| Ni reduction degree | % | 85 | 86 | 85 | 82 |

Comparative Example 2

40 mL of a solution in which nickel nitrate (75 g/L nickel) and sodium silicate (50 g/L silicon) were dissolved in distilled water was added to a precipitation container, stirred, and heated to a temperature of 80° C. After the temperature reached 80° C., 40 mL of a solution including sodium carbonate (144 g/L) was all injected within 1 hour by using a syringe pump. After completion of precipitation, a slurry was washed with about 1.5 L of distilled water, filtered, and then dried at 120° C. for 8 hours or more by using a drying oven. After this was subdivided, the catalyst was activated by performing the reduction at a temperature of 400° C. in a hydrogen atmosphere. The activated catalyst was passivated using a nitrogen mixed gas including 1% oxygen to prepare a hydrogenation catalyst. Based on the weight of the catalyst, a nickel oxide (NiO) content of a passivated catalyst was measured as 78.5 parts by weight, and an average size of nickel crystals was measured as 3.8 nm. A BET specific surface area was 235 m²/g, a total pore volume was 0.45 m³/g, and an average pore size was 5.9 nm. A catalyst particle size distribution was $D_{10}$ of 2.2 μm, $D_{50}$ of 5.0 μm, and $D_{90}$ of 11.3 μm. A nickel (Ni) reduction degree analyzed by $H_2$-TPR was 87%.

Comparative Example 3

A hydrogenation catalyst was prepared in the same manner as in Example 1, except that a porous silica powder having an average particle size of 4.5 μm was used as a catalyst preparation material.

Comparative Example 4

A hydrogenation catalyst was prepared in the same manner as in Example 1, except that a porous silica powder having an average particle size of 10.4 μm was used as a catalyst preparation material.

Table 2 below shows the components in the catalyst compositions of Comparative Examples 2, 4, and 4.

TABLE 2

| Classification | Unit | Comparative Example 2 | Comparative Example 3 | Comparative Example 4 |
|---|---|---|---|---|
| CuO/(NiO + CuO) | parts by weight | 0 | 1.24 | 1.20 |
| SO₃/NiO | parts by weight | 0 | 0.64 | 1.02 |
| Ni crystallite size | nm | 3.8 | 3.6 | 3.9 |
| NiO | parts by weight | 78.5 | 78.4 | 78.6 |
| CuO | parts by weight | 0 | 1.05 | 1.01 |
| SO₃ | parts by weight | 0 | 0.5 | 0.8 |
| SiO₂ | parts by weight | 19.0 | 19.2 | 18.9 |
| BET specificSurface area | m²/g | 235 | 250 | 255 |
| Total poreVolume | cm³/g | 0.45 | 0.38 | 0.37 |
| Mean pore diameter | nm | 5.9 | 6.0 | 5.8 |
| $D_{10}$ | μm | 2.2 | 1.5 | 4.3 |
| $D_{50}$ | μm | 5.0 | 4.5 | 10.4 |
| $D_{90}$ | μm | 11.3 | 11.9 | 16.6 |
| Ni reduction degree | % | 87 | 88 | 86 |

Experimental Example 1. Catalyst Activity Test

A 300 mL autoclave including a hollow shaft stirrer and having a stirring speed of 1,600 rpm was used. 75 g of a solution in which 30 wt % of a non-hydrogenated hydrocarbon resin was dissolved in Exxsol D40 was hydrogenated at 230° C. and 90 bar by adding 0.5% catalyst based on the mass of the hydrocarbon resin. The activity was compared by measuring the consumption amount of hydrogen for 30 minutes after the start of the reaction, and the consumption amount of hydrogen is shown in Table 3 below.

TABLE 3

| | Consumption amount of hydrogen (ΔP, atm) |
|---|---|
| Example 1 | 18.7 |
| Example 2 | 18.5 |
| Example 3 | 18.7 |
| Comparative Example 1 | 14.5 |

As described in Table 2 above, it can be confirmed that, in the case in which a copper promoter is added, even when a high content of nickel is supported, the nickel crystallite size is relatively small, and thus the hydrogenation activity of the hydrocarbon resin has a higher value than that of Comparative Example 1.

Experimental Example 2. Catalyst Activity Test

A catalyst activity test was performed using catalysts having different average particle sizes. A 300 mL autoclave including a hollow shaft stirrer and having a stirring speed of 1,600 rpm was used. 75 g of a solution in which 30 wt % of a non-hydrogenated hydrocarbon resin was dissolved in Exxsol D40 was hydrogenated at 230° C. and 90 bar by adding 0.5% catalyst based on the mass of the hydrocarbon resin. The activity was compared by measuring the consumption amount of hydrogen for 30 minutes after the start of the reaction, and the consumption amount of hydrogen is shown in Table 4 below.

TABLE 4

| | Consumption amoutn of hydrogen (ΔP, atm) |
|---|---|
| Example 1 | 18.7 |
| Comparative Example 3 | 18.8 |
| Comparative Example 4 | 15.2 |

When comparing the activities of hydrogenation catalysts prepared using porous silica powders having different average particle sizes in Experimental Example 2, there was no difference in the activity of the catalyst up to a certain size as in the results of Comparative Example 3 and Example 1. However, it was confirmed that the activity of the catalyst is lowered as the size is increased, as in Comparative Example 4.

Experimental Example 3. Measurement of Particle Size Distribution of Catalyst 0.36 g of a catalyst was added to 30 g of a solution in which 60 wt % of a non-hydrogenated hydrocarbon resin was dissolved in Exxsol D40, and was pulverized at 20,000 rpm for 1 hour by using a homogenizer. After the pulverization, a portion of the solution was subdivided and the particle size of the catalyst was measured.

The particle size distribution measurement results are shown in Table 5.

TABLE 5

| | Example 1 | | | Comparative Example 2 | |
|---|---|---|---|---|---|
| Item | Before pulverization | After pulverization | Item | Before pulverization | After pulverization |
| $D_{10}$(μm) | 2.5 | 1.7 | $D_{10}$(μm) | 2.2 | 1.3 |
| $D_{50}$(μm) | 5.5 | 5.2 | $D_{50}$(μm) | 5.0 | 3.2 |

TABLE 5-continued

| | Example 1 | | | Comparative Example 2 | |
|---|---|---|---|---|---|
| Item | Before pulverization | After pulverization | Item | Before pulverization | After pulverization |
| $D_{90}(\mu m)$ | 12.9 | 12.6 | $D_{90}(\mu m)$ | 11.3 | 6.5 |
| Proportion of particles having a size of 1 μm or less (%) | 4.0 | 4.9 | Proportion of particles having a size of 1 μm or less (%) | 3.7 | 7.6 |

Figure 1:
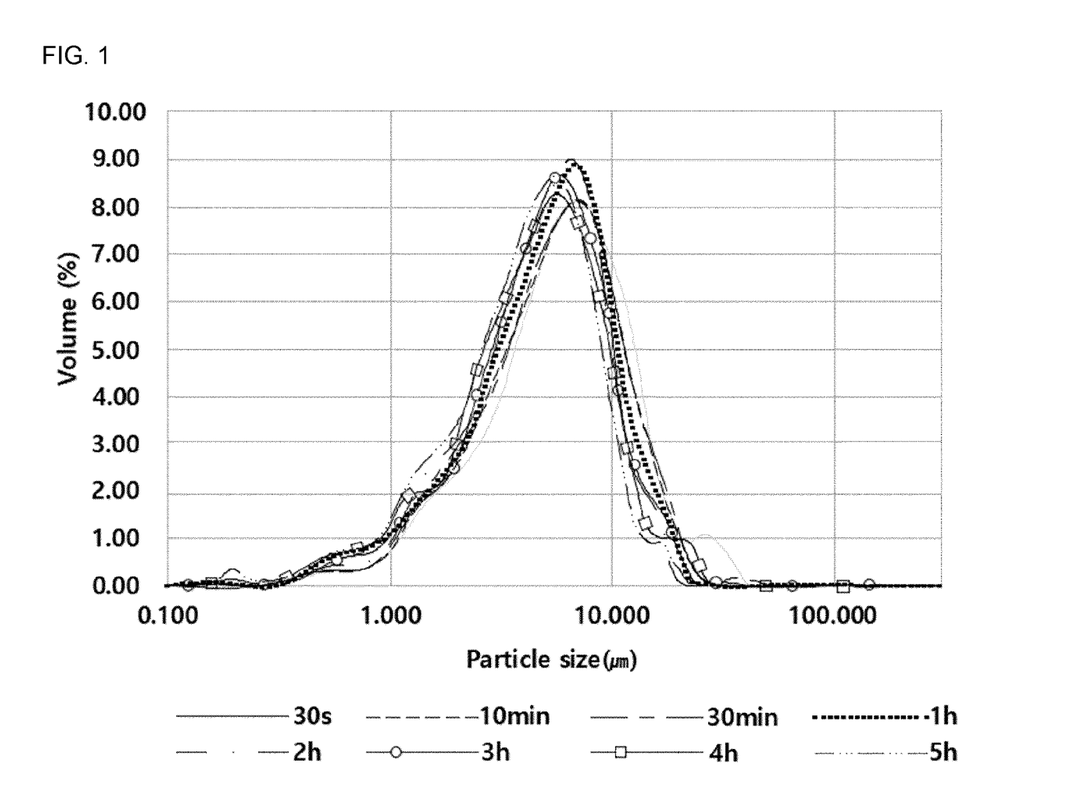
FIG. 1 shows a change in a particle size distribution of a catalyst over time according to Example 1.
Figure 2:
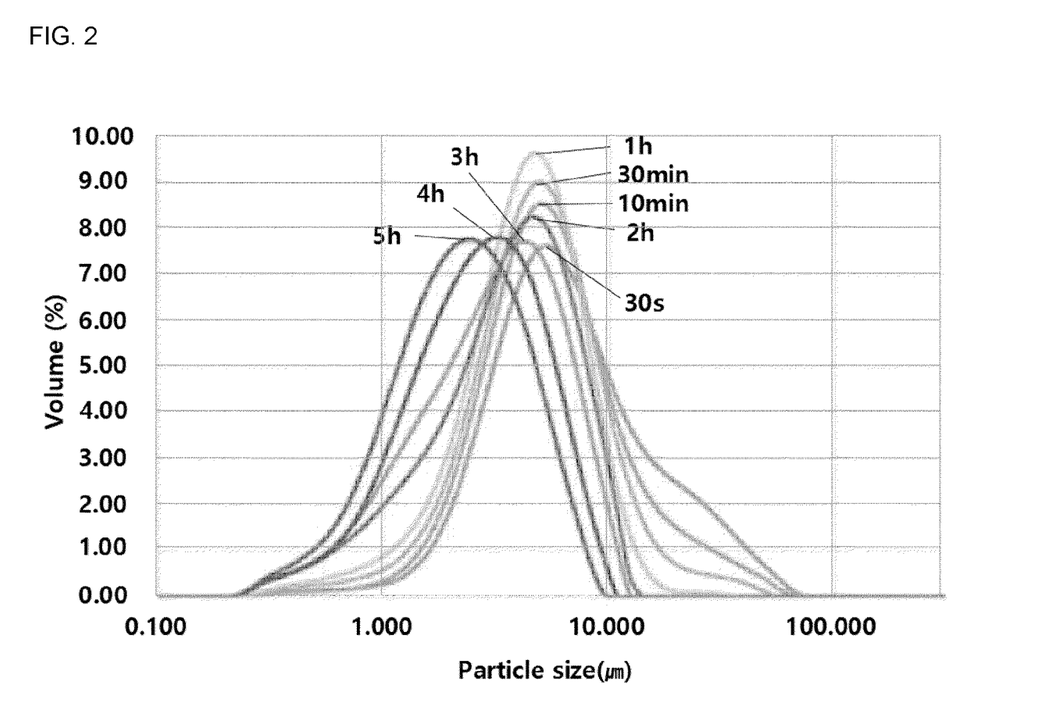
FIG. 2 shows a change in a particle size distribution of a catalyst over time according to Comparative Example 2.

In addition, graphs obtained by analyzing the particle size distributions of the catalysts prepared in Example 1 and Comparative Example 2 over time at 20,0000 rpm are shown in FIGS. 1 and 2, respectively. FIG. 1 shows the results according to Example 1, and FIG. 2 shows the results according to Comparative Example 2.

Through the results in Table 5 and the drawings, it was confirmed that the crushing of particles was suppressed in Example 1 prepared by supporting nickel on the silica carrier by the DP method, compared with Comparative Example 2 prepared by the coprecipitation method.

Experimental Example 4. Test to Confirm Filterability of Catalyst

After a filter paper having a pore size of 0.5 μm is fastened to a joint-connected solid suspension filtration device, a pressure in a flask of the filtration device was maintained at 100 mbar by using a vacuum pump. After pulverization of Experimental Example 3, 20 g of the solution was taken and stored in an oven at 100° C. for 10 minutes. Then, the heated solution was poured into the filtration device, and a weight of a hydrocarbon resin solution filtered for 2 minutes was measured. A filtration rate was calculated by dividing the amount of the filtered solution by the time and the area of the filter. The filtration rate measurement results are shown in Table 6.

TABLE 6

| | Before pulverization ($g/min \cdot cm^2$) | After pulverization ($g/min \cdot cm^2$) |
|---|---|---|
| Example 1 | 0.94 | 0.83 |
| Comparative Example 2 | 0.96 | 0.62 |

From the results of Table 6, it was confirmed that, compared with the catalyst prepared by the coprecipitation method (Comparative Example 2), the filtration rate was faster after the pulverization of the catalyst of Example 1, and the difference in filtration rate before and after pulverization was also small in the case of the catalyst of Example 1.

Experimental Example 5. Test to Confirm Filterability of Catalyst

In the same manner as in Experimental Example 4, the catalyst particle size and filterability of Example 1 and Comparative Examples 3 and 4 before crushing were compared and shown in Table 7.

TABLE 7

| Item | Example 1 | Comparative Example 3 | Comparative Example 4 |
|---|---|---|---|
| $D_{10}(\mu m)$ | 2.5 | 1.5 | 4.3 |
| $D_{50}(\mu m)$ | 5.5 | 4.5 | 10.4 |
| $D_{90}(\mu m)$ | 12.9 | 11.9 | 16.6 |
| Filtration rate ($g/min \cdot cm^2$) | 0.94 | 0.73 | 1.13 |

As can be confirmed from Table 7, when the catalyst particle size is small, the filtration rate is low, which may cause difficulties in applying to the process.

From the results of Experimental Examples of Examples and Comparative Examples, it was confirmed that, in the nickel catalyst according to the present invention, the particle size distribution of the catalyst had an average particle size $D_{10}$ of 2 μm or more, $D_{50}$ of 5-7 μm, and $D_{90}$ of 15 μm or less, the size distribution of the catalyst particles was uniform due to the use of the silica carrier having a controlled particle size distribution, crushing of particles was suppressed during high-speed rotation in the hydrogenation reaction, and the filterability was improved in the hydrocarbon resin hydrogenation reaction.

In addition, it can be confirmed that, since copper is included as a promoter, the activity of the catalyst for the hydrogenation reaction is improved by improving dispersibility while including a high content of nickel and having a small crystallite size of nickel.

In addition, according to an embodiment of the present invention, when necessary, the promoter may further include 0.1-2 parts by weight of at least one selected from sulfur and sulfur oxide.

In addition, a high reduction degree may be provided at a low reduction temperature of 300-450° C., compared to an existing DP method.

In addition, it can be confirmed that high activity is provided by including the meso pore diameter size and specific surface area according to the nitrogen adsorption method.

While the present invention has been described by particular matters such as specific components and limited embodiments and drawings, this is provided only for helping the comprehensive understanding of the present invention. The present invention is not limited to the above-described embodiments, and it will be understood by those of ordinary skill in the art that various modifications and variations can be made thereto without departing from the scope of the present invention.

Therefore, it will be understood that the spirit of the present invention should not be limited to the above-described embodiments and the claims and all equivalent modifications fall within the scope of the present invention.

The invention claimed is:

1. A catalyst for hydrogenation, comprising:
   50-80 parts by weight of nickel oxide;
   0.01-5 parts by weight of copper oxide and 10-50 parts by weight of a silica carrier, wherein a particle size distribution of the catalyst has $D_{10}$ of 2 μm or more, $D_{50}$ of 5-7 μm, and $D_{90}$ of 15 μm or less, and
   wherein a ratio between a weight of the copper oxide to a weight sum of the nickel oxide and the copper oxide is 0.01-2.0:100.

2. The catalyst of claim 1, wherein the catalyst further comprises 0.1-2 parts by weight of at least one selected from sulfur and sulfur oxide.

3. The catalyst of claim 2, wherein the sulfur oxide is included in an amount of 0.1-2.0 parts by weight based on 100 parts by weight of the nickel oxide.

4. The catalyst of claim 1, wherein the catalyst has a meso pore size of 4.5 nm or more in pore structure analysis using a nitrogen adsorption method, a BET specific surface area of 200 m$^2$/g or more, and a cumulative BJH adsorption volume of 0.25 cm$^3$/g or more.

5. The catalyst of claim 1, wherein the nickel has a crystallite size of 3-8 nm.

6. The catalyst of claim 1, wherein the silica carrier is a porous carrier having a specific surface area of 200-400 m$^2$/g and a pore size of 10-30 nm.

7. The catalyst of claim 1, wherein the hydrocarbon resin comprises at least one selected from a hydrocarbon resin including C$_5$ fraction comprising dicyclopentadiene (DCPD), and a hydrocarbon resin including C$_9$ fraction.

8. The catalyst of claim 1, wherein the catalyst is in at least one form selected from a powder form, a particle form, and a granular form.

9. A method for preparing a catalyst for hydrogenation, comprising the steps of:
preparing a first solution by dissolving a nickel precursor in a solvent, so that a weight concentration (g/L) of nickel in a solution is 25 to 250;
preparing a second solution by adding a copper precursor to the first solution, so that a weight concentration (g/L) of copper in a solution is 0.01 to 5;
preparing a third solution by adding a silica carrier to the second solution and dispersing the silica carrier, so that a weight concentration (g/L) of silica in a solution is 10 to 50;
adding the third solution to a precipitation container and stirring and heating the third solution to a temperature to 50-120° C.;
adding a pH control agent to the heated third solution and depositing the nickel and copper precursors on the solid silica carrier forming a precipitation;
washing and filtering the supported catalyst and drying the supported catalyst at 100-200° C. for 5 to 24 hours;
calcining the dried catalyst at a temperature of 200-500° C. in air; and
activating the calcined catalyst by reducing the calcined catalyst to a temperature of 200-500° C. in a hydrogen atmosphere,
wherein a particle size distribution of the catalyst has D$_{10}$ of 2 μm or more, D$_{50}$ of 5-7 μm, and D$_{90}$ of 15 μm or less, and
wherein the nickel is included in an amount of 50 parts by weight or more, and
nickel oxide and copper oxide are included, wherein a ratio between a weight of the copper oxide to a weight sum of the nickel oxide and the copper oxide is 0.01-2.0:100.

10. The method of claim 9, further comprising, after the activating step, passivating the catalyst.

11. The method of claim 10, wherein the catalyst is passivated with a nitrogen mixed including 0.1-20% oxygen, or is passivated by immersion in a solution including an organic solvent.

12. The method of claim 9, wherein the precipitation is formed at pH 7-9.

13. A hydrogenation method for a hydrocarbon resin comprising contacting a hydrocarbon resin with hydrogen in the presence of a catalyst prepared by the method of claim 9.

14. The hydrogenation method of claim 13, wherein the hydrocarbon resin comprises at least one selected from a hydrocarbon resin including C$_5$ fraction comprising dicyclopentadiene (DCPD), and a hydrocarbon resin including C$_9$ fraction.

* * * * *